United States Patent
Navab et al.

(10) Patent No.: US 11,430,203 B2
(45) Date of Patent: Aug. 30, 2022

(54) COMPUTER-IMPLEMENTED METHOD FOR REGISTERING LOW DIMENSIONAL IMAGES WITH A HIGH DIMENSIONAL IMAGE, A METHOD FOR TRAINING AN ARITIFICIAL NEURAL NETWORK USEFUL IN FINDING LANDMARKS IN LOW DIMENSIONAL IMAGES, A COMPUTER PROGRAM AND A SYSTEM FOR REGISTERING LOW DIMENSIONAL IMAGES WITH A HIGH DIMENSIONAL IMAGE

(71) Applicant: Maxer Endoscopy GmbH, Wurmlingen (DE)

(72) Inventors: Nassir Navab, Munich (DE); Matthias Grimm, Munich (DE); Javier Esteban, Munich (DE); Wojciech Konrad Karcz, Munich (DE)

(73) Assignee: MAXER Endoscopy GmBH, Wurmlingen (DE)

( * ) Notice: Subject to any disclaimer, the term of this patent is extended or adjusted under 35 U.S.C. 154(b) by 61 days.

(21) Appl. No.: 17/062,255

(22) Filed: Oct. 2, 2020

(65) Prior Publication Data
US 2021/0103753 A1    Apr. 8, 2021

(30) Foreign Application Priority Data
Oct. 4, 2019  (DE) .......................... 202019004094.3

(51) Int. Cl.
*G06V 10/20*  (2022.01)
*G06K 9/62*   (2022.01)
*G06N 3/08*   (2006.01)

(52) U.S. Cl.
CPC ......... *G06V 10/255* (2022.01); *G06K 9/6251* (2013.01); *G06K 9/6256* (2013.01); *G06N 3/08* (2013.01)

(58) Field of Classification Search
None
See application file for complete search history.

(56) References Cited

U.S. PATENT DOCUMENTS

| 2016/0100773 A1 | 4/2016 | Ching et al. |
| 2017/0296274 A1 | 10/2017 | van der Walt et al. |
| 2021/0137634 A1* | 5/2021 | Lang .................. A61B 5/0205 |

OTHER PUBLICATIONS

J. Esteban et al.: "Towards Fully Automatic X-Ray to CT Registration", (2019) MICCAI 2019, LNCS 11769, pp. 631-639. https://doi.org/10.1007/078.3-030-32226-7_70.

(Continued)

*Primary Examiner* — Leon Flores
(74) *Attorney, Agent, or Firm* — Bodman PLC

(57) ABSTRACT

A computer-implemented method for registering low dimensional images with a high dimensional image includes receiving a high dimensional image of a region of interest and simulating synthetic low dimensional images of the region of interest from a number of poses of a virtual low dimensional imaging device, from the high dimensional image. The method determines positions of landmarks within the low dimensional images by applying a first learning algorithm to the low dimensional images and back projecting of the positions of the determined landmarks into the high dimensional image space, to thereby obtain the positions of the landmarks in the high dimensional image. The positions of landmarks within low dimensional images acquired form an imaging device are determined by applying the first or a second learning algorithm to the low (Continued)

dimensional images. The low dimensional images are registered with the high dimensional image based on the positions of the landmarks.

13 Claims, 12 Drawing Sheets

(56) References Cited

OTHER PUBLICATIONS

B. Bier et al.: "Learning to detect anatomical landmarks of pelvis in X-rays from arbitrary views", International Journal of Computer Assisted Radiology and Surgery (2019) 14, Apr. 20, 2019, pp. 1463-1473. https://doi.org/10.1007/s11548-019-01975-5.

L. Haofu et al.: "Multiview 2D/3D Rigid Registration via a Point-of-Interest Network for Tracking and Triangulation", (2019) IEEE/CVF Conference on Computer Vision and Pattern Recognition (CVPR), pp. 12630-12639.

* cited by examiner

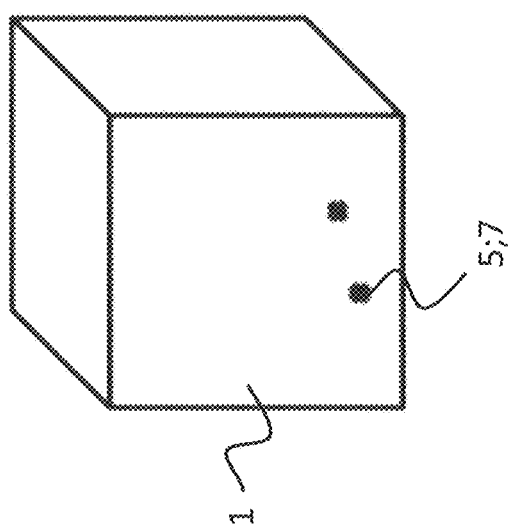
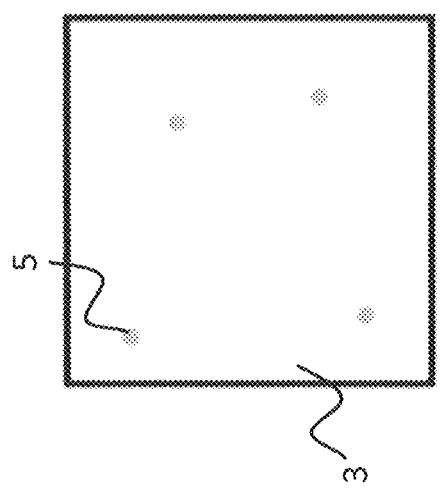
Fig. 4

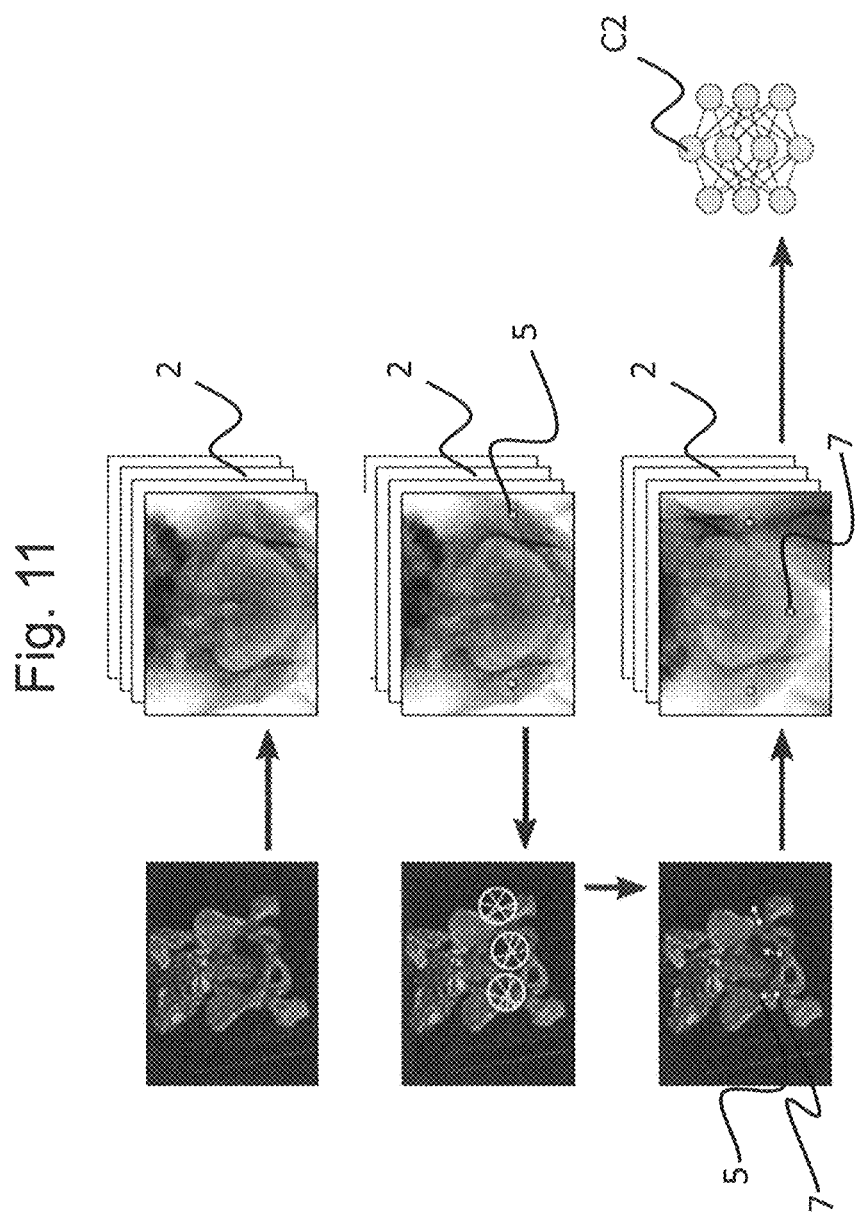

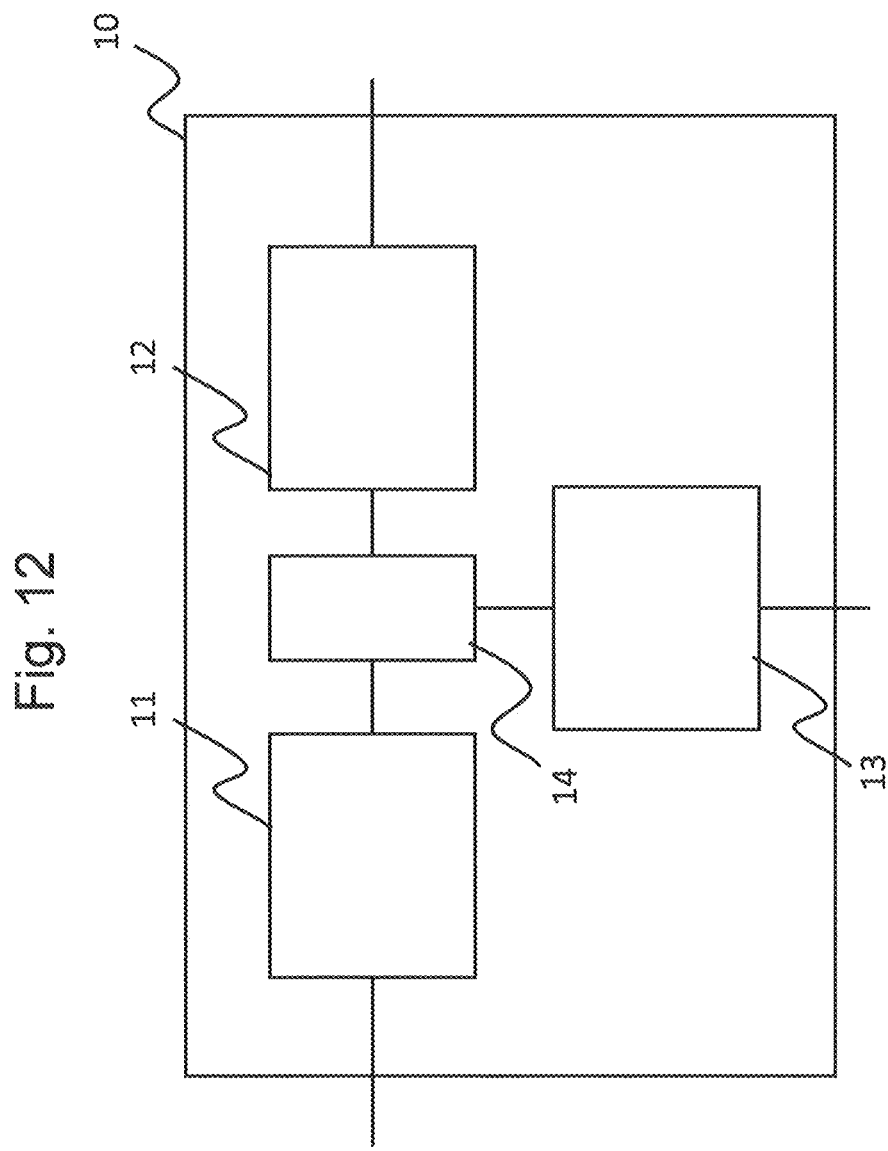

COMPUTER-IMPLEMENTED METHOD FOR REGISTERING LOW DIMENSIONAL IMAGES WITH A HIGH DIMENSIONAL IMAGE, A METHOD FOR TRAINING AN ARITIFICIAL NEURAL NETWORK USEFUL IN FINDING LANDMARKS IN LOW DIMENSIONAL IMAGES, A COMPUTER PROGRAM AND A SYSTEM FOR REGISTERING LOW DIMENSIONAL IMAGES WITH A HIGH DIMENSIONAL IMAGE

CROSS-REFERENCE TO RELATED APPLICATION

This application claims priority to German Patent Application No. DE 20 2019 004 094.3, filed Oct. 4, 2019, the disclosure of which is incorporated herein by reference in its entirety.

TECHNICAL FIELD

The present disclosure relates to a computer-implemented method for registering low dimensional images with a high dimensional image, a method for training an artificial neural network useful in finding landmarks in low dimensional images, a computer program and a system for registering low dimensional images with a high dimensional image. In particular the present disclosure relates to the field of image data processing, more precisely the multimodal registration of image data.

BACKGROUND

Registration refers to an alignment of high dimensional images (i.e. multidimensional scans or images) with low dimensional scans or images acquired with mobile devices such as C-arms, wherein high dimensional images have more dimensions as compared to low dimensional images. High dimensional scans in general are more precise. High dimensional scans have several advantages such as high precision, high contrast between different materials, and reproducibility. The use of these higher dimensional scans or of the segmented data obtained from this is common in various applications, from augmented reality solutions to robot planning. The unsolved problem of use of this information during interventions in the object or living being in all of these applications is the necessary registration process, as the generation of high dimensional scans requires time and is not always possible during interventions. For this purpose, the pose of an intervention-suitable low dimensional imaging device in relation to the coordinate origin of the high dimensional scans have to be calculated. In the case of the registration of a 2D X-ray acquired by a C-arm with a 3D Computed Tomography (CT) registration, this is for example the three-dimensional position and orientation of the C-arm in relation to the coordinate origin of the CT.

Known methods can be divided into two classes. The first class requires an initialization for a pose of the intervention-suitable low dimensional imaging device. Further, artificial low dimensional scans that would be obtained for a given pose of the low dimensional imaging device have to be simulated from the high dimensional scan. Using these two components, the low-dimensional scan is now simulated for the initial pose. Then the position of the virtual low-dimensional imaging device is minimally changed on a trial basis. For each of these changes a new artificial low dimensional image is generated, and it is calculated how similar the simulated low-dimensional scan is to an actual low-dimensional scan. Accordingly, the pose is changed to maximize the similarity. The similarity is usually calculated using image metrics, such as the sum of the intensity differences per image element (such as pixels in 2D images or voxels in 3D images). The disadvantage of these method is that it requires a good initialization. If the initial pose of the intraoperative imaging device is far from the actual pose, methods of this class will not be able to calculate the correct pose.

The other class is based on finding corresponding markers in the high dimensional and low-dimensional scans. Once the positions of the markers are known, the resulting mathematical problem can be solved. One problem with these methods is that they require markers. These usually have to be implanted into the object or living being before the acquisition of the high dimensional scan, which results in a second invasive procedure. Instead of markers, it is theoretically possible to use object-internal or anatomical landmarks. However, this requires that sufficient landmarks can be accurately recognized in both modalities and correctly assigned to each other.

US 2017296274 A1 discloses a hip joint navigation jig that includes an anatomical interface comprising a bone engagement portion. A registration jig is also provided that is coupled with the anatomical interface. A rotatable member is provided for rotation about an axis that is not vertical when the jig is mounted to the bone adjacent to a hip joint and the registration jig is coupled with the anatomical interface. An anatomy engaging probe is coupled with the rotatable member for rotation about the axis and is translatable to enable the probe to be brought into contact with a plurality of anatomical landmarks during a procedure. An inertial sensor is coupled with the probe to indicate orientation related to the landmarks, the sensor being disposed in a different orientation relative to horizontal when the probe is in contact with the landmarks.

US 2016100773 A1 discloses devices for electronically registering a surgical patient to his or her own pre-surgical image scan and associated systems and methods. In some embodiments, a surgical navigation registration device configured in accordance with the technology comprises a patient-specific inner surface having at least one contour element that matches a contour of an outer surface of at least a portion of the patient's anatomy, and at least three registration pathways incorporated in the device and configured to mate with the tip of a surgical navigation system tool, such as a pointer. The registration pathways may be configured to enable the tip of the surgical navigation system tool to directly contact the patient's anatomy or, alternatively, to prevent the tip of the surgical navigation system tool from directly contacting the patient's anatomy. The registration pathways may comprise channels that extend through the patient-specific inner surface.

SUMMARY

The present invention solves the problem of providing a fully automatic registration between a high dimensional image and low dimensional images by providing a computer-implemented method for registering low dimensional images with a high dimensional image, a method for training an artificial neural network useful in finding landmarks in low dimensional images, a computer program and a system for registering low dimensional images with a high dimensional image.

In particular, the present invention solves the registration problem between multidimensional data (i.e. a high dimensional image) and low dimensional data (low dimensional images). For a given pair of higher and lower dimensional scans or images, the unknown pose to be solved for good registration is exactly where the imaging device would have to be placed to produce the same low dimensional image. One advantage of the present invention is that it is fully automatic. The solution of the present invention does not require any manual initialization and does not require the invasive implantation of markers.

According to an aspect a computer-implemented method for registering low dimensional images with a high dimensional image is provided, the method comprising the steps of:
a) receiving a high dimensional image of a region of interest,
b) simulating synthetic low dimensional images of the region of interest from a number of poses of a virtual low dimensional imaging device, from the high dimensional image,
c) determining positions of landmarks within the low dimensional images by applying a first learning algorithm (C1) to the low dimensional images,
d) back projecting of the positions of the determined landmarks into the high dimensional image space, to thereby obtain the positions of the landmarks determined in step c) in the high dimensional image,
e) receiving low dimensional images acquired with a low dimensional imaging device of the region of interest,
f) determining positions of landmarks within the low dimensional images by applying the first or a second learning algorithm (C1,C2) to the low dimensional images, and
g) registering the low dimensional images with the high dimensional image based on the positions of the landmarks.

The high dimensional image may be also referred to as a higher dimensional image, because it may have a higher dimension as compared to the low dimensional images. In the present case, registration refers to an alignment or geometrical adjustment of multidimensional scans or images (i.e. high dimensional images), which are often recorded with complex location-based devices such as Computed Tomography, with low-dimensional scans or images (i.e. low dimensional images) acquired with mobile imaging devices such as C-arms. The mobile imaging devices may be suitable to be used for acquiring low dimensional images during an intervention or surgery. High dimensional scans may be precise higher-dimensional reconstructions of an object or the body of a living being, where the image information may encode a property of the material at any point. This type of imaging has several advantages such as high precision and reproducibility, as well as high contrast between different materials. However, the generation of the high dimensional image is not possible during an interventional setup (e.g. during a surgery). In order to use the advantage of the high dimensional image during an intervention, the low dimensional images acquired during the intervention have to be registered with the high dimensional image. For example, the information provided by a high dimensional image may be in particular useful in minimal invasive interventions. That is, the position of an interventional device may be received by the intervention-suitable low dimensional imaging device and may be then displayed within the high dimensional image.

For the registration of the low dimensional images with the high dimensional image, a pose of an intervention-suitable low-dimensional imaging device in relation to the coordinate origin of the high dimensional image may be calculated. As a result, the low dimensional images may be registered with the high dimensional image. According to one aspect of the present invention, a 2D X-ray (low dimensional image) is registered with a 3D Computed Tomography (CT) image (high dimensional image). For example, the three-dimensional position and orientation of the C-arm in relation to the coordinate origin of the CT may be determined.

The high dimensional image may be received from a database or an imaging device configured to acquire high dimensional images. The high dimensional image may be acquired in advance.

Based on the high dimensional image, synthetic low-dimensional scans or images (i.e. artificial or simulated images) may be generated. The synthetic low-dimensional images may be obtained by means of a computer program from the high dimensional image. Here, the computer program may receive internal parameters of a virtual low dimensional imaging device, which is to be simulated, the high dimensional image and the position of the virtual low dimensional imaging device. Then the program may simulate the generation process of the low dimensional images on the basis of the desired position of the virtual low-dimensional imaging device and the characteristics of the high dimensional image. An example of this is the simulation of X-ray images from CT scans using so-called "digitally reconstructed radiographs" (DRR). The step of simulating the synthetic low dimensional images may be executed during an intervention.

According to aspects of the present invention, different types of modalities (types of scans or images) may be used for low dimensional images and the high dimensional image. The different modalities may be defined by the different physical image formation processes of different types of imaging devices. Examples may be x-ray images, ultrasound images, or Computed Tomography scans.

According to a further aspect of the present invention, landmarks are extracted in an object or creature-specific manner. Accordingly, an object or creature-specific high dimensional image may be processed as described in the following.

First, synthetic low dimensional images covering a wide range of poses of virtual imaging device may be simulated from the high dimensional image of the object or living being. Then, the first learning algorithm may be applied to the low dimensional images to capture the rough positions of the landmarks within the low dimensional images (i.e. the artificial images). That is, the synthetic low dimensional images may be used as input data to the first learning algorithm. Accordingly, the first learning algorithm may output the positions of the landmarks (i.e. output data).

The learning algorithm may be a classifier, for example. Further, the learning algorithm may be configured to map input data to desired output data. Learning may refer to a property that the algorithm may define a general model with parameters. The mapping of input data to output data may be a mathematical function depending on parameters. The algorithm may learn the mapping of input data to output data by adjusting its parameters for given pairs of input data and desired output data in such a way that the output of the algorithm is as similar as possible to the desired output. Similarity may be defined by a mathematical cost function (i.e. a mapping that takes the output and the desired output of the learning algorithm as input and transfers it to a real number), which has to be specified by a user (e.g. a developer). The lower the value (i.e. the real number) of the cost function, the more similar the output is to the desired output. The learning algorithm may be an artificial neural network.

Accordingly, the learning algorithm may be trained. In addition, the learning algorithm may be retrained, too. Retraining may be similar to the training. The difference is that during training the learning algorithm may start with random values for its parameters. On the other hand, when the learning algorithm is retrained, the learning algorithm may start with the values of a previously trained learning algorithm. Therefore, retraining of the learning algorithm may be faster and more efficient as compared to the step of training.

For training the learning algorithm, a training set may be used. The training set may be a collection of pairs of images (e.g. scans) and features (e.g. landmarks). The collection may be used to develop a learning algorithm that accepts the images as input and gives the corresponding feature as an output. In this case the features may be the positions of landmarks in the low dimensional images.

A landmark may be a descriptive and easily recognizable point in an image (e.g. a scan). For example, the landmarks may be anatomically significant points in a patient's medical scan or image, such as the corneal apex in an optical coherence tomography scan of a human eye. As a result, no physical marker has to be implanted prior to the registration process. That is, no additional intervention is necessary which increases the comfort for the patient.

The synthetic low dimensional images may be simulated by projecting. The Projecting may be a linear mapping, in which elements of a high dimensional space are mapped ("projected") onto elements of a low dimensional space.

According to an aspect of the present invention, the known geometry (of all generated images) may be used to back project each landmark back to the high dimensional space. The high dimensional space may be the space in which the high dimensional image is depicted. Accordingly, a low dimensional space may be the space in which the low dimensional image is depicted. The output of this step is a (rough) representation of the landmarks in the high dimensional image. Specifically, back projection may be a mapping in which elements of a low dimensional space (e.g. a low dimensional image) are mapped onto elements of a high dimensional space (e.g. a high dimensional image). For example, if the inner geometry of a pinhole camera and its position in the real world is known, pixels on the image of the pinhole camera may be mapped to rays in the real world, i.e. may be back-projected. As a result, the positions of the landmarks previously determined in the synthetic low dimensional images are also known in the high dimensional image.

According to the present invention, low dimensional images are received that are acquired with a low dimensional imaging device. The low dimensional images may be real low dimensional intraoperative images of a region of interest. The region of interest may correspond to the region of interest depicted in the high dimensional image. Specifically, the low dimensional images may be received in real-time during an intervention. Then the first learning algorithm or a second learning algorithm is used to determine the landmarks in the real low dimensional intraoperative images. Accordingly, the position of the landmarks in the high dimensional image, as well as the position of the landmarks in the low dimensional images and the intrinsic parameters for the image formation process of the low dimensional imaging device are known. Therefore, the pose of the low-dimensional imaging device may be calculated.

As a result, the low dimensional images may be registered with the high dimensional image (i.e. the registration between the multidimensional and low-dimensional modalities may be executed). The second learning algorithm may be based on the first learning algorithm. That is, the second learning algorithm may be a retrained version of the first learning algorithm.

The second learning algorithm may determine patient specific landmarks because it may be trained or retrained with a patient specific training set of low dimensional images. That is, the second learning algorithm may be trained based on synthetic low dimensional images simulated from a high dimensional image of the specific patient under examination. On the other hand, the first learning algorithm may determine object specific landmarks because it may be trained with an object specific training set of low dimensional images. In other words, object specific may mean that the same region of interest or object such as the spine or a part thereof, the pelvis etc. are used to generate the training set. That is, the first learning algorithm may be trained based on synthetic low dimensional images simulated from a high dimensional image of the specific object or region of interest under examination, but not necessarily from the specific patient under examination.

Further, knowing the position of the landmarks in the low dimensional images and in the high dimensional image, both may be registered with one another. As a result, the advantages of the high dimensional image may be used during an intervention and a user is not only dependent on the low dimensional images which may be acquired during the intervention.

Preferably, the step of registering includes a step of determining the pose of the low dimensional imaging device used to acquire the low dimensional images, and wherein in the step of determining the pose, a perspective-n-point problem is solved, which has the positions of the landmarks within the low dimensional images and the positions of the landmarks within the high dimensional image as an input and the pose of the low dimensional imaging device as an output.

Since the first or second learning algorithm may be applied to the real low dimensional images (e.g. real X-ray images) of the patient, the positions of the landmarks in the low dimensional images are known. Further, the landmarks on the high dimensional image (e.g. a CT) of the patient may be known from the above step d). Therefore, the positions of the landmarks in the high dimensional image and the positions of the landmarks in the low dimensional images (e.g. a radiograph) may define a "Perspective-n-Point" problem, which is then solved. The solution to this problem may be the registration sought. Specifically, the "Perspective-n-Point" is a problem of estimating a pose of a calibrated camera given a set of 3D points in the world and their corresponding 2D projections in the image. The camera pose may consist of 6 degrees-of-freedom (DOF) which are made up of the rotation (roll, pitch, and yaw) and 3D translation of the camera with respect to the world. This problem originates from camera calibration and may have many applications in computer vision and other areas, including 3D pose estimation, robotics and augmented reality.

The perspective-n-point method is preferably usable in case a projective geometry (e.g. X-ray) is used as the low dimensional images. In case another modality is used the 2D landmarks (i.e. in the low dimensional images) and the 3D landmarks (i.e. in the high dimensional image) may be matched using other methods. For example, the Iterative Closest Point Algorithm (ICP) may be used.

Preferably, the first learning algorithm is trained by input training data and by output training data, wherein the input training data comprises synthetic low dimensional images determined by simulating synthetic low dimensional images of the region of interest from a number of poses of a virtual low dimensional imaging device, from an arbitrary high dimensional image including the region of interest, and wherein the output training data comprises positions of landmarks in the low dimensional images and is generated by manual landmark definition in the high dimensional image and projecting the landmarks from the high dimensional image to the low dimensional images.

The first learning algorithm (e.g. a classifier) may be trained in a pre-training step. Preferably, the first learning algorithm is trained globally only once. That is, a first learning algorithm may be trained to recognize a series of object-internal or anatomical landmarks. In order to generate a training set for the first learning algorithm, several high dimensional images may be manually tagged with a series of known landmarks. The anatomical landmarks may be annotated by experts for a previously acquired or received training set, i.e. the experts may manually determine the position of the anatomical landmarks. Anatomical landmarks may be e.g. the tip of the two transverse processes and the tip of the spinous process for each individual vertebra of the spinal column. The locations may be chosen in such a way that they are significant for the application (usually intervention) and may be clearly identified. Then, synthetic low dimensional images may be simulated from the high dimensional images and, using the known geometry/poses of the simulated low-dimensional imaging devices, the landmarks may be projected from the high dimensional image onto the artificially generated synthetic low dimensional images. For this purpose, a large number of so-called "digitally reconstructed radiographs" (DRRs) may be generated from the high dimensional image (e.g. a CT). A DRR may be an X-ray image which is simulated from a CT. The DRRs are simulated for a large number of different poses of a virtual imaging device (e.g. a virtual C-arm). In addition, the training set may be generated for a wide range of poses of the virtual imaging device to ensure sufficient coverage of the region of interest. Thanks to the known geometry of the virtual C-arms that the DRRs may generate, the position of the projection of the landmarks in the DRRs may be determined for each DRR. As a result, a huge artificial training set consisting of artificial images and the projected landmarks may be generated. In other words, a training data set may be built, which consists of pairs of the individual DRRs and the positions of the landmarks. The data set contains these pairs for each of the previously collected CTs. The high dimensional images used in this step may be acquired from different people, but include the same region of interest (i.e. anatomical structure). Therefore, the synthetic low dimensional images may be generated from an arbitrary high dimensional image. If more than one high dimensional image should be used to simulate the synthetic low dimensional images, all high dimensional images may include the same region of interest or the same object. Thus, an efficient working of the first learning algorithm may be ensured. Alternatively, the high dimensional images may include different regions of interest of objects. In this case a wide applicability of the first learning algorithm may be attained.

This training set may be then used to train the first learning algorithm. Accordingly, the first learning algorithm may receive an X-ray as input and outputs the positions of the anatomical landmarks within this X-ray. The output of this pre-training step may be a learning algorithm (i.e. classifier) that may find the selected set of landmarks in low dimensional images. In addition, the first learning algorithm may be used for all future objects of similar nature or creatures of the same genus (i.e. the same learning algorithm for the same objects or same creatures). This phase only needs to be performed once globally. Afterwards, the same learning algorithm may be always used for each patient. Accordingly, the first learning algorithm (e.g. a trained neural network) may be generated that recognizes the position of anatomical landmarks on low dimensional images (e.g. x-ray images).

The projecting may be a linear mapping, in which elements of a high dimensional space are mapped ("projected") onto elements of a low dimensional space. One example is the imaging process in a pinhole camera, in which three-dimensional coordinates in the real world are mapped onto two-dimensional coordinates on an image. Accordingly, the manually annotated landmarks in the high dimensional image may be projected to the synthetic low dimensional images.

Preferably, the second learning algorithm is trained by input training data and by output training data, wherein the input training data comprises synthetic low dimensional images determined in step b), and wherein the output data comprises positions of the landmarks in the low dimensional images, generated by determining landmarks within the synthetic low dimensional images by applying the first learning algorithm to the synthetic low dimensional images, back projecting each of the determined landmarks of the synthetic low dimensional images in a hyperplane on the high dimensional space, wherein each hyperplane extends from each of the determined landmarks to the origin of the synthetic low dimensional image, generating new landmarks within the high dimensional image based on the hyperplanes, and projecting the new landmarks of the high dimensional image to the synthetic low dimensional images.

Accordingly, by the second learning algorithm an automatic object or creature-specific landmark extraction may be executed. For training (i.e. for generating a raining set) the second learning algorithm a hyperplane rear projection may be executed. For this purpose, synthetic low dimensional images may be simulated from the high dimensional image of the object or living being, which cover a large range of poses. The first learning algorithm may be applied to capture the rough positions of the landmarks in the synthetic low dimensional images (i.e. the artificial images). The known geometry of all generated synthetic low dimensional images may be used to project each landmark back into a hyperplane on the high dimensional space. This means that a hyperplane may be created from the landmark found in the projection (i.e. in the synthetic low dimensional image) to the source of the synthetic low dimensional image (i.e. the artificial image). If the landmark is perfectly detected by the first learning algorithm, the calculated hyperplane passes through the corresponding position of the landmark in the high dimensional image. However, due to inaccuracy of the first learning algorithm (i.e. the noise accumulated in the detection step), the hyperplane might not pass exactly through corresponding position of the landmark in the high dimensional image. Nevertheless, if enough hyperplanes are generated, it is possible to successfully determine the correct position of the landmark in the high dimensional space despite the noise accumulated in the detection step. The output of this phase may be a rough representation of the number of landmarks in the higher-dimensional data.

For example, DRRs may be simulated by the virtual C-arm for the CT of the patient from many poses. The first learning algorithm may be then applied to the simulated DRRs. Thanks to the known geometry of the virtual C-arm, each detected landmark in each DRR may be assigned to a line or ray between the position of the landmark projection on the detector of the C-arm and the camera center of the C-arm.

Then, based on the hyperplanes (e.g. lines or rays) a refinement of the landmarks in the high dimensional image may be executed. Due to the inherent inaccuracy of the prediction of the first learning algorithm, the hyperplanes resulting from a given landmark do not intersect perfectly at the same point. To overcome this lack of precision, a series of refined landmarks (i.e. new landmarks) may be generated.

Since the back-projected landmarks in the high dimensional image do not necessarily describe the same real landmarks, retraining of the first learning algorithm may be used as an additional step to increase the performance of the method. For the retraining of the learning algorithm, a new set of artificial, low dimensional images may be created and the new landmarks in the high dimensional image may be projected from the points found in the above step to the synthetic low dimensional images. This may result in an object or creature specific learning algorithm, which ensures an increase in detection quality. In addition, retraining of the first learning algorithm may ensure that a sufficient variability is covered and at the same time an object or creature-specific system is created that may be adapted to the real internal structure of the object or anatomy of the creature. That is, the retraining is based on training data (i.e. synthetic low dimensional images) that is simulated from a high dimensional image of the specific patient under examination. Therefore, the second learning algorithm is preferable to generate an object or creature-specific landmark extraction.

Accordingly, a learning algorithm may be trained or retrained, which receives X-ray images of the patient as input and outputs the positions of the landmarks calculated in the above step on the X-ray images as output. For this purpose, DRRs for the CT of the patient may be simulated in many poses. A training set may be built using the same method as in the above pre-training step, but in this case the DRRs may be simulated exclusively from the patient's CT. Furthermore, the landmarks which may be projected are in this case the new landmarks from the above step (i.e. the refined landmarks). The second learning algorithm may be then trained, which receives X-ray images of the patient as input and outputs the positions of the projected landmarks on the X-ray images as output.

A hyperplane may be a subspace whose dimension is one less than that of its ambient space. If a space is 3-dimensional then its hyperplanes are the 2-dimensional planes, while if the space is 2-dimensional, its hyperplanes are the 1-dimensional lines. This notion may be used in any general space in which the concept of the dimension of a subspace is defined. Accordingly, the hyperplane may be a line in the low dimensional image (i.e. in a 2D image space) and may be a plane in the high dimensional image (i.e. in a 3D image space).

Preferably, each new landmark is generated at the intersection of the hyperplanes relating to the same landmark, within the high dimensional image data.

Since the hyperplanes may be a plane in the 3D image space of the high dimensional image, there is a definite intersection of two planes. These new landmarks may be at the intersections of the hyperplanes.

Preferably, the hyperplanes include projection lines extending through one landmark and the origin of the synthetic low dimensional image, respectively, and wherein each new landmark is generated by determining for each possible pair of projecting lines the point which has the smallest Euclidean distance to both lines, and by determining the barycenter of all points determined from all pairs of projection lines.

That is, in this case the hyperplanes may not be planes in the high dimensional image, but may be projection lines in the 3D image space of the high dimensional image. In order to determine the position of the new landmark, the point with the smallest Euclidean distance to both projection lines is calculated for each landmark for each possible pair of lines. Then the barycenter of all these points is calculated. The newly obtained points may be the new landmarks for the CT of the patient.

Further, the two following criteria may be applied for determining the position of the new landmarks in the high dimensional image: each new landmark shall stay as close as possible to the barycenter of the point of intersection of all projected lines or of the point with the smallest Euclidean distance to all projected lines (i.e. rays) and be located on a bone surface. These criteria may be executed for each landmark. That is, each new landmark may be determined by a determination of the barycenter via robust ray intersection, and projecting this position to the bone surface.

The bone may be an anatomical structure within the region of interest at which the real landmark may be located. Accordingly, the above approach may be independently conducted for determining all new landmarks. Hereinafter, the approach is described for a single landmark.

First, the point corresponding to the rough barycenter of the intersection of all projection lines may be determined. For two given projection lines the closest equidistant point may be calculated. A constant threshold (e.g. 6 mm) may be used to discard candidate points when two projection lines are too far apart. The coordinates of the point may be defined as the median x, y, and z coordinates of all valid points.

Then, the point corresponding to the projection of points onto the bone surface may be determined. The high dimensional image may be first thresholded (e.g. Hounsfield units in [200; 500] may be mapped to one bone, all other values may be mapped to zero background). A contour detection scheme may be then applied to the thresholded high dimensional image. The point on the bone surface may be finally determined via a sphere-growing scheme centered on the candidate point to find the closest point on the bone surface. The determined point on the bone surface may be the new landmark.

Preferably, the second learning algorithm is generated by retraining the first learning algorithm.

That is, the second learning algorithm may be retrained by a new set of training data including input training data and output training data. The retraining may be similar to the training. The difference is that during training, the learning algorithm may start with random values for its parameters. If a learning algorithm is retrained, the learning algorithm may start with the values of a previously trained learning algorithm. As a result, the retraining may be faster and thus more efficient as compared to the first training.

Preferably, the first learning algorithm and the second learning algorithm are a first trained artificial neural network and a second trained artificial neural network.

Preferably, the landmarks are anatomical features.

For example, anatomical landmarks are the tip of the two transverse processes and the tip of the spinous process for each individual vertebra of the spinal column. As a result, there is no need to implant any physical markers which may be used as landmarks.

Preferably, the low dimensional image is one of the following: a 2D X-ray image, a 2D ultrasound image, a 2D optical image, a 2D scintigraphy or 2D optoacoustic image.

Preferably, the high dimensional image is one of the following: a 3D computer tomography image, 3D magnetic resonance image, a 3D ultrasound image, a 3D Nuclear medicine image, a 3D depth camera image, or a 3D optoacoustic image.

As a result, one of the following possible combinations may be implemented as the high dimensional image and the low dimensional images.

3D computed tomography and 2D X-ray image
3D computed tomography and 2D ultrasound
3D computed tomography and 2D optical image
3D computed tomography and 2D scintigraphy
3D computed tomography and 2D optoacoustic image
3D magnetic resonance imaging and 2D ultrasound
3D magnetic resonance imaging and 2D X-ray
3D magnetic resonance imaging and 2D optical image
3D magnetic resonance imaging and 2D scintigraphy
3D magnetic resonance imaging and 2D optoacoustic image
3D ultrasound and X-ray image
3D ultrasound and 2D ultrasound
3D Ultrasound and 2D X-ray image
3D ultrasound and 2D optical image
3D Ultrasound and 2D Scintigraphy
3D ultrasound and 2D optoacoustic image
3D Nuclear medical tomography and 2D X-ray image
3D nuclear medical tomography and 2D ultrasound
3D nuclear medical tomography and 2D optical image
3D Nuclear medical tomography and 2D Scintigraphy
3D nuclear medical tomography and 2D optoacoustic image
3D depth camera and 2D X-ray image
3D furnace camera and 2D ultrasound
3D depth camera and 2D optical image
3D depth camera and 2D scintigraphy
3D depth camera and 2D optoacoustic image
3D optoacoustic image and 2D X-ray image
3D optoacoustic image and 2D ultrasound
3D optoacoustic image and 2D optic image
3D optoacoustic image and 2D scintigraphy
3D optoacoustic image and 2D optoacoustic image According to another aspect of the present invention, a method for training or retraining an artificial neural network useful in finding landmarks in low dimensional images is provided, the method comprising:

receiving input training data, namely synthetic low dimensional images of a region of interest simulated from a number of poses of a virtual low dimensional imaging device, from a high dimensional image of the region of interest, receiving output training data, namely synthetic low dimensional images of the region of interest and positions of landmarks within the low dimensional images, wherein the output data comprises positions of the landmarks in the low dimensional images, generated by determining landmarks within the synthetic low dimensional images by applying a first artificial neural network (C1) to the synthetic low dimensional image, back projecting each of the determined landmarks of the synthetic low dimensional images in a hyperplane on the high dimensional space, wherein each hyperplane extends from each of the determined landmarks to the origin of the synthetic low dimensional image, generating new landmarks within the high dimensional image based on the hyperplanes, and projecting the new landmarks of the high dimensional image to the synthetic low dimensional images.

In other words, the second learning algorithm may be a retrained version of the first learning algorithm. That is, the already trained first learning algorithm may be further trained (i.e. retrained) so as to obtain the object specific second learning algorithm. Accordingly, the retraining may be executed using a specified set of training data. Alternatively, the second learning algorithm may be trained without being based on the previously trained first learning algorithm.

According to another aspect of the present invention, a computer program comprising instruction, which, when the program is executed by a computational unit, causes the computational unit to carry out the method of any one of claim 1 to 13.

This is true for the method for registering low dimensional images with a high dimensional image and for the training method of the first and second artificial neural networks. Alternatively, the neural networks may be implemented as hardware, for example with fixed connections on a chip or other processing unit. The computational unit, which may execute the inventive method, may be any processing unit such as CPU (Central Processing Unit) or GPU (Graphics Processing Unit). The computational unit may be part of a computer, a cloud, a server, a mobile device such as a laptop, tablet computer, mobile phone, smartphone etc. In particular, the computational unit may be part of a low dimensional imaging device. Said low dimensional imaging device may also comprise a display device such as a computer screen.

The invention is also directed to a computer-readable medium comprising instructions which, when executed by a computational unit, causes the computational unit to carry out the method according to the invention, in particular, the above method or the training method. Such computer-readable medium may be any digital storage medium, for example a hard disk, a server, a cloud, or a computer, an optical or a magnetic digital storage medium, a CD-ROM, a SSD-card, a SD-card, a DVD or an USB or other memory stick.

According to a further aspect of the present invention a system for registering low dimensional images with a high dimensional image is provided, the system comprising:

a first interface, configured for receiving a high dimensional image, a second interface, configured for receiving low dimensional images from an imaging device during a surgery, a computational unit, configured for executing the above method, a third interface, configured for outputting a registered image.

The system is preferably configured to execute the invention for registering low dimensional images with a high dimensional image. Such a system may be implemented on a low dimensional imaging device, e.g. it is implemented on one of its processing units such as a GPU. However, it is also considerable that the low dimensional images acquired by the low dimensional imaging system are transferred to another computational unit, local or remote, for example via internet, and the registered image is transferred back from there to the low dimensional imaging device and displayed. The third interface may thus be connected to a display device, such as a computer screen, touch screen etc.

Further, the invention is also directed to a system for training an artificial neural network by the training method described herein.

According to an embodiment of the present invention, the registration process may be executed by three phases as exemplarily described in the following.

Phase 1 learning algorithm pre-training:

This phase is only run globally once. Here a learning algorithm is trained to recognize a series of object-internal or anatomical landmarks. Several high-dimensional images are manually tagged with a series of known landmarks. The locations were chosen in such a way that they are significant for the application (usually intervention) and can be clearly identified. Low dimensional images are then simulated from the high dimensional images and, using the known geometry of the simulated low dimensional imaging devices, the landmarks are projected from the high dimensional scan in the artificially generated low dimensional scans. This results in a huge artificial training set consisting of artificial images and the projected landmarks, which is then used to train the learning algorithm (i.e. the first learning algorithm). This data is generated for a wide range of poses to ensure sufficient coverage of the region of interest. The output of this step is a learning algorithm that can find the selected set of landmarks in low dimensional images. The same learning algorithm is always used for all future objects of similar nature or creatures of the same genus.

Phase 2 automatic object or creature specific landmark extraction:

Object or creature specific high dimensional data (e.g. high dimensional image) may be processed in three steps as described below:

2.a) The first sub-step consists of a hyperplane rear projection. For this purpose, synthetic low dimensional images covering a wide range of poses are simulated from the high dimensional image of the object or living being. The learning algorithm created in the previous step is then applied to capture the rough positions of the landmarks in the artificial images. The known geometry of all generated images is used to project each landmark back into a hyperplane on the high dimensional space. This means that a hyperplane is created from the landmark found in the projection to the source of the artificial image. When the landmark is perfectly detected, the calculated hyperplane passes through the corresponding position of the landmark in the high dimensional data. If enough hyperplanes are generated, it is possible to successfully determine the correct position of the landmark in high dimensional space despite the noise accumulated in the detection step. The output of this phase is a rough representation of the number of landmarks on the higher dimensional data.

2.b) Refinement of the landmarks: Due to the inherent inaccuracy of the prediction in the learning algorithm, the hyperplanes resulting from a given landmark do not intersect perfectly at the same point. To overcome this lack of precision, a series of refined landmarks is generated. These landmarks are the intersections of the hyperplanes.

2.c) Object- or creature-specific retraining: Since the back-projected landmarks do not necessarily describe the same real landmarks, retraining of the learning algorithm (i.e. of the first learning algorithm) is used as an additional step to increase the performance of the system. For the retraining of the learning algorithm, a new set of artificial, low dimensional images is created and the landmarks are projected from the points found in the previous step. This results in an object or creature specific learning algorithm (i.e. the second learning algorithm), which ensures an increase in detection quality. In addition, retraining of the first learning algorithm ensures that sufficient variability is covered and at the same time an object or creature-specific system is created that can be adapted to the real internal structure of the object or anatomy of the creature.

Phase 3 actual registration: The system uses the learning algorithm generated as output of the previous phase to find the landmarks on the real low-dimensional intraoperative images. Since this means that the position of the landmarks on the multidimensional scan, the position of the landmarks on the low-dimensional scan and the intrinsic parameters for the image formation process of the low-dimensional recording device are known, the pose of the low-dimensional imaging device can be calculated. This enables the registration between the multidimensional and low-dimensional modalities.

All advantage and features of the inventive methods are also applicable to the device by analogy and vice versa. Individual features of the individual embodiments and/or aspects may be combined with each other within the scope of the invention.

In summary, the present invention differs from the prior art in that that the present invention works automatically, whereas another known method requires manual input from an operator (e.g. for initialization of an initial position of the low dimensional imaging device). Further, the present invention is not based on the "Projection slice theorem", but calculates the registration by means of the calculated position of corresponding landmarks. In addition, the present invention does not work with learned atlas coordinate systems, but instead recognizes corresponding landmarks. The inventive method is independent of the intervention because no high dimensional images have to be obtained during the intervention and no mechanical device has to be applied to the patient during the intervention. In other words, the registration according to the present invention is based on scans or images and not on a physical device. A further difference of the present invention with respect to the prior art is that the registration between two scans is calculated by means of image-based procedures and is not performed manually. The present invention generates a set of low-dimensional scans to train a learning algorithm for the recognition of landmarks. Furthermore, the present invention calculates the registration based on landmarks while other methods look up the registration based on a database. A further known method deals with the registration of images of the same modality and does not contain any object specific step. Unlike other known methods in which a registration is only considered complete when its assessment of reconstruction is above a predetermined threshold and an iterative registration which is refined with each iteration by means of a reconstruction is provided, the present invention does not provide such steps. Specifically, the present invention may calculate a registration between two scans or images of the same patient. Furthermore, the present invention may calculate a registration as the pose of the imaging device of the low-dimensional images relative to the coordinate origin of the high dimensional image. Other known methods calculate a registration as a deformation field as to how a scan must be deformed in order to represent a given anatomy.

Useful embodiments of the invention shall now be described with reference to the attached figures. Similar elements or features are designated with the same reference signs in the figures. In the figures:

BRIEF DESCRIPTION OF THE DRAWINGS

FIG. 4 is a schematic visualization of a part of the method according to the embodiment of the present invention, FIG. 11 is a schematic visualization of a part of the method according to another embodiment of the present invention, FIG. 12 is a schematic visualization of a system according to an embodiment of the present invention.

DETAILED DESCRIPTION

Figure 1:
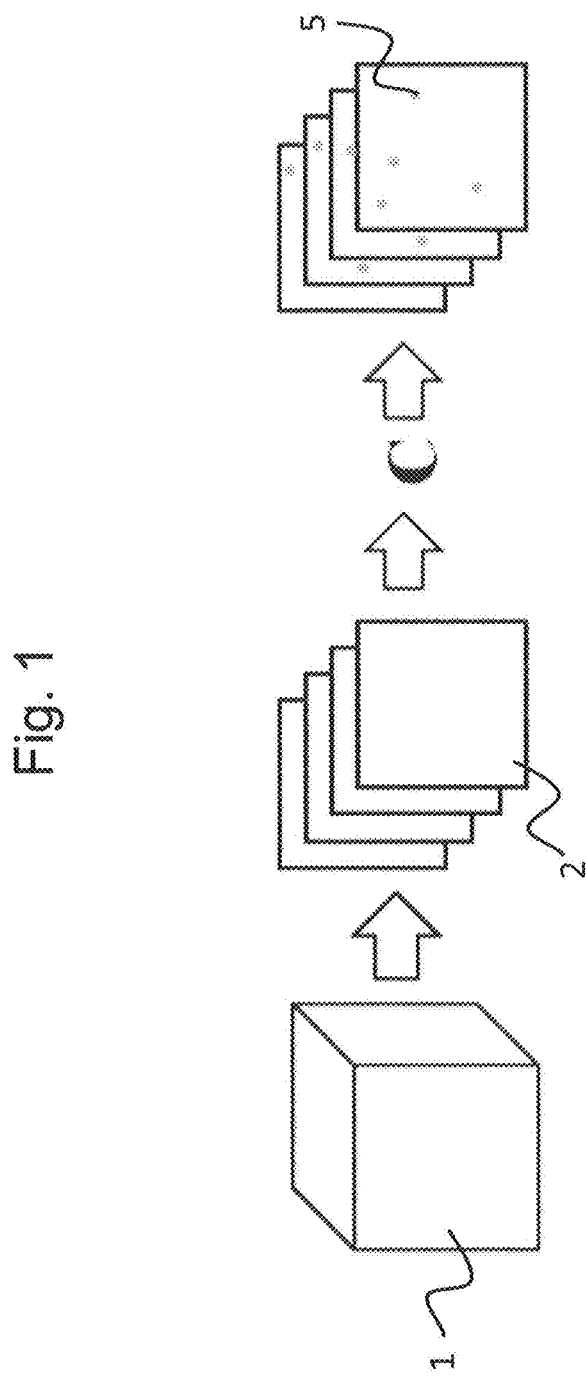
FIG. 1 is a schematic visualization of a part of a method according to an embodiment of the present invention.

FIG. 1 is a schematic visualization of a part of a method according to an embodiment of the present invention. In particular, a high dimensional image 1 is provided, including a region of interest (i.e. an anatomical structure to be examined). Based on the high dimensional image 1 synthetic low dimensional images 2 of the region of interest are simulated using digitally reconstructed radiographs. The synthetic low dimensional images 2 are simulated in a number of poses of a virtual low dimensional imaging device 6 (not depicted in FIG. 1). Then, a first learning algorithm C1 is applied to the synthetic low dimensional images 2 in order to determine landmarks 5 within the synthetic low dimensional images 2. The first learning algorithm C1 is pre-trained by training data for detecting landmarks in the specific region of interest.

In a further embodiment not depicted in the figures, another method is used to simulate the low dimensional images based on the high dimensional image.

Figure 2:
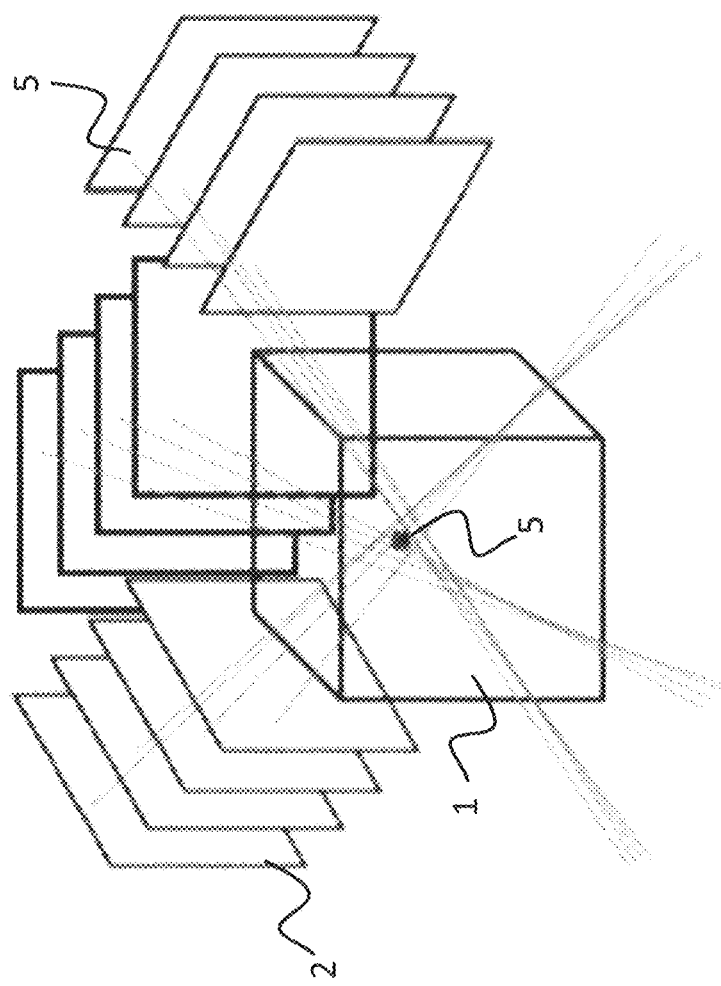
FIG. 2 is a schematic visualization of a part of the method according to the embodiment of the present invention.

FIG. 2 is a schematic visualization of further a part of the method according to the embodiment of the present invention. After a plurality of synthetic low dimensional images 2 are generated and the landmarks 5 are determined by the first learning algorithm C, the landmarks 5 are back projected into the high dimensional image space of the high dimensional image 1. As a result, the position of the landmarks 5 in the high dimensional image 1 may be determined.

Figure 3:
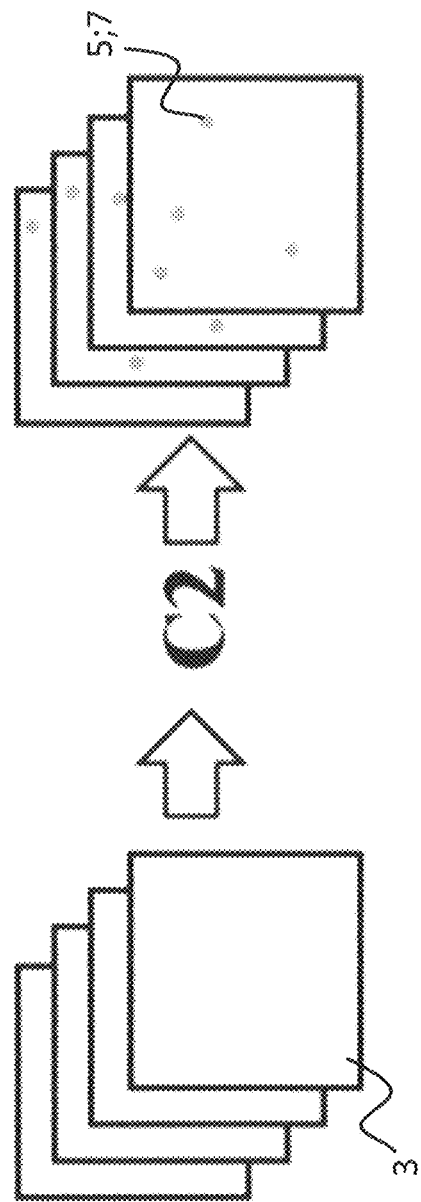
FIG. 3 is a schematic visualization of a part of the method according to the embodiment of the present invention.

FIG. 3 is a schematic visualization of further a part of the method according to the embodiment of the present invention. Accordingly, low dimensional images 3 are provided which are acquired with a low dimensional imaging device. The low dimensional images 3 are acquired by a low dimensional imaging device usable during an intervention. In the present embodiment, a second learning algorithm C2 is applied to the low dimensional images 3 in order to determine the landmarks 7. In another embodiment (not depicted in the figures) the first learning algorithm C1 is applied to the low dimensional images 3 in order to determine the landmarks 5.

FIG. 4 is a schematic visualization of further a part of the method according to the embodiment of the present invention. Now the position of the landmarks 5,7 in the low dimensional images 3 and in the high dimensional image 1 are known. Therefore, the low dimensional images 3 and in the high dimensional image 1 may be registered with one another based on the positions of the landmarks 5;7. In the present embodiment, the high dimensional image 1 is a CT and the low dimensional images 3 are X-ray images. Specifically, the position of the landmarks 5;7 on the CT and the position of the landmarks on the X-ray image define a "Perspective-n-Point" problem, which is then solved. The solution to this problem is the registration sought. As a result, the low dimensional images 3 and the high dimensional image 1 are registered so that during the intervention information provided by the high dimensional image 1 may be additionally used.

Figure 5:
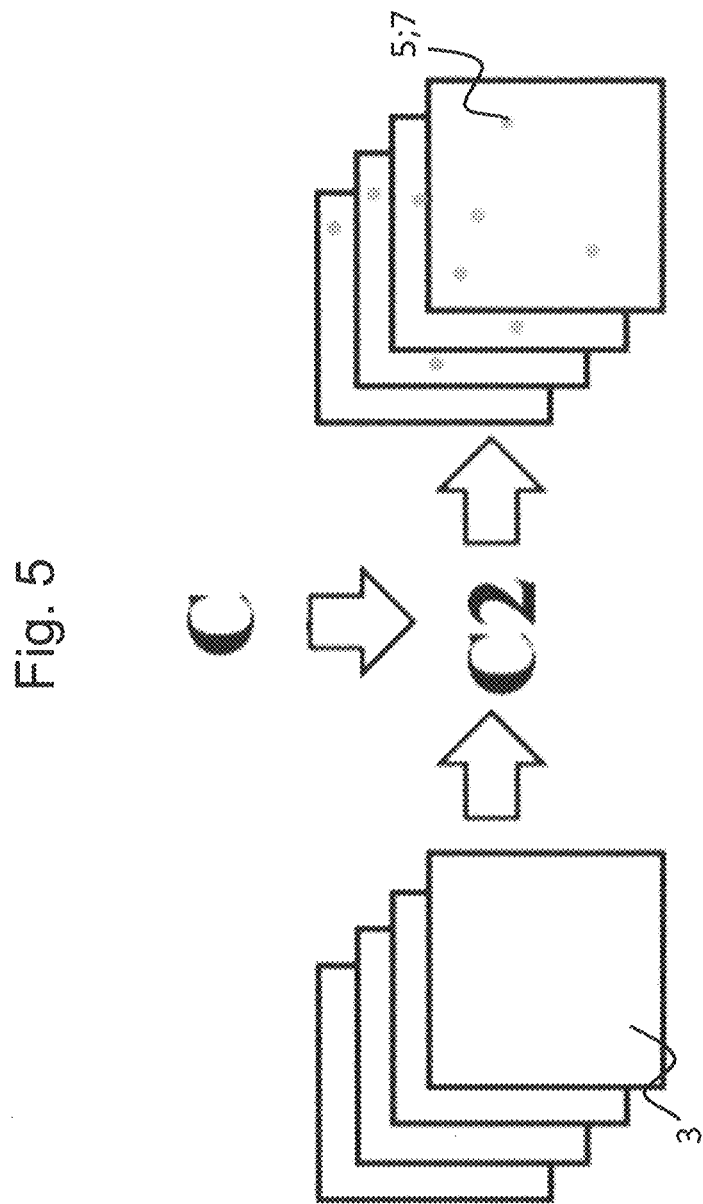
FIG. 5 is a schematic visualization of a part of the method according to another embodiment of the present invention.

FIG. 5 is a schematic visualization of a part of a method according to another embodiment of the present invention. Accordingly, low dimensional images 3 are provided which are acquired with a low dimensional imaging device as depicted in FIG. 3. In the present embodiment, the second learning algorithm C2 is based on the first learning algorithm C. That is, the second learning algorithm C2 is a retrained version of the first learning algorithm C. Therefore, the second learning algorithm C2 is trained so as to be a patient specific learning algorithm.

That is, the retraining is carried out for each patient. In more detail, DRRs 2 for the patient's CT 1 are simulated from many poses of the virtual imaging device 6. The first learning algorithm C1 is then applied to the simulated DRRs 2 in order to find the landmarks 5. Thanks to the known geometry of the simulated C-arms, each detected landmark 5 in each DRR 2 can be assigned to a line between the position of the landmark 5 projection on the detector of the C-arm and the camera center of the C-arm.

Subsequently, the position of the landmarks 5 in the CT 1 are refined. In other words, new landmarks 7 are determined in the CT 1. For this purpose, the point with the smallest Euclidean distance to both lines is calculated for each landmark 5 for each possible pair of lines. Then the barycenter of all these points is calculated. Alternatively, an intersection of two hyperplanes relating to the same landmark 5 and extending from the landmark 5 in the synthetic low dimensional image 2 to the origin of the synthetic low dimensional image 2 is determined as the new landmark 7 in the high dimensional image 1. The newly obtained points are the new landmarks 7 for the CT 1 of the patient (also refer to FIG. 9). The new landmarks 7 are projected onto the synthetic low dimensional images 2.

Then, the second learning algorithm C2 is trained, by synthetic low dimensional images 2 (e.g. DRRs2) simulated from the CT 1 of the patient from many poses. That is, a training set is built using the same method as in connection with the first learning algorithm C1, but in this case the DRRs 2 are simulated exclusively from the patient's CT 1. Therefore, the second learning algorithm is a patient specific learning algorithm. Furthermore, the landmarks which are projected are in this case the new landmarks 7. The second learning algorithm C2 is then trained, which receives x-ray images 3 of the patient as input and outputs the positions of the projected landmarks 7 on the x-ray images 3 as output.

Figure 6:
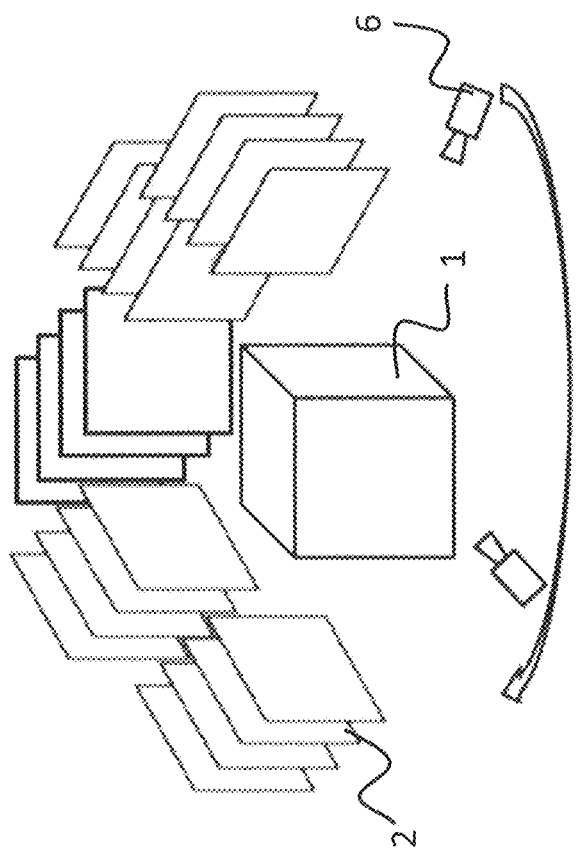
FIG. 6 is a schematic visualization of a part of the method according to another embodiment of the present invention.

FIG. 6 is a schematic visualization of a part of a method according to an embodiment of the present invention. In FIG. 6 the creation of synthetic interventional low-dimensional images 2 from a real high dimensional image 1 is depicted. Accordingly, synthetic low-dimensional images 2 and a real high dimensional image 1 are used to train the first learning algorithm C1 for automatic recognition of landmarks 5 in low dimensional images 2. Further, in FIG. 6 a virtual imaging device 6 is depicted. The arrow in FIG. 6 indicates that the virtual imaging device 6 may be moved with respect to the high dimensional image 1. Accordingly, the synthetic low dimensional images 2 may be simulated in a plurality of different poses of the virtual imaging device 6.

Figure 7:
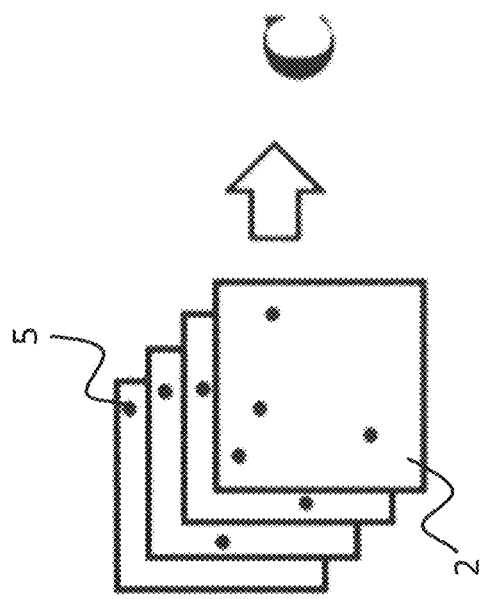
FIG. 7 is a schematic visualization of a part of the method according to another embodiment of the present invention.

FIG. 7 is a schematic visualization of a part of a method according to an embodiment of the present invention. In FIG. 7 the synthetic low dimensional images 2 including the positions of the landmarks 5 are used to train the first learning algorithm C. This is the pre-training of the first learning algorithm and is executed only once.

Figure 8:
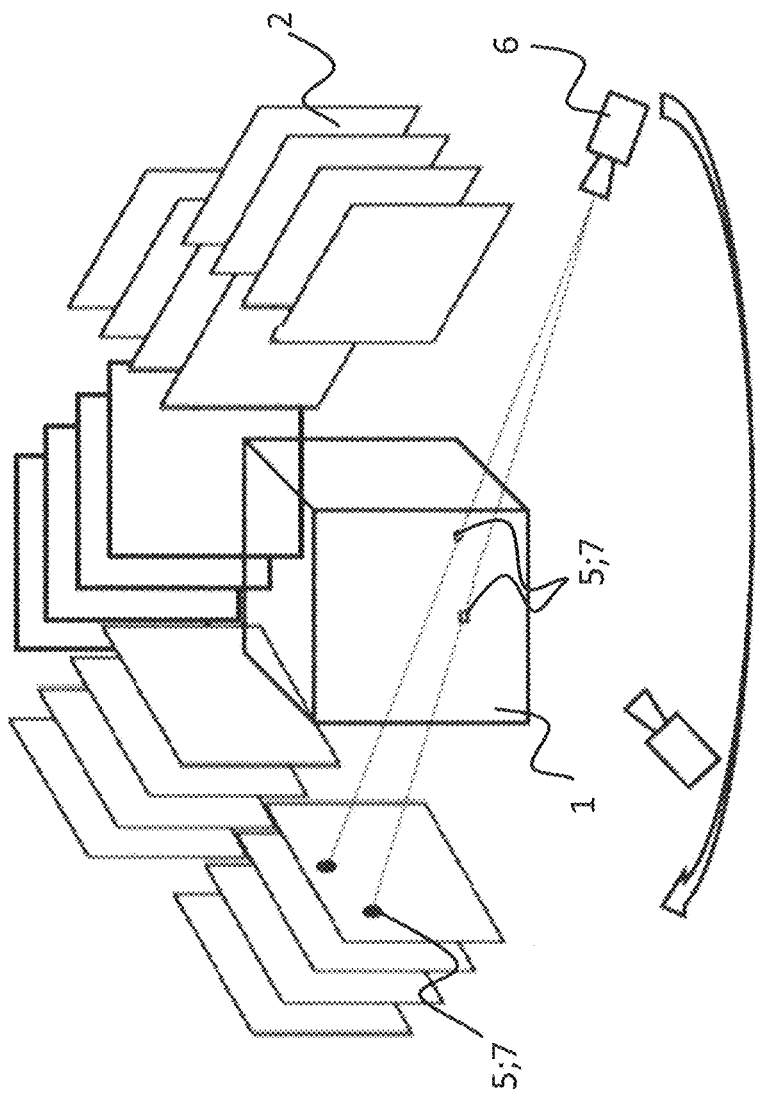
FIG. 8 is a schematic visualization of a part of the method according to another embodiment of the present invention.

FIG. 8 is a schematic visualization of a part of a method according to an embodiment of the present invention. FIG. 8 corresponds essentially to FIG. 6 with the addition that the method of projecting is depicted in detail. That is, the landmark 5 in the high dimensional image 1 is mapped in a linear manner to the synthetic low dimensional images 2. In other words, elements of a higher-dimensional space are mapped ("projected") onto elements of a lower-dimensional space. It is to be noted that the new landmarks 7 are projected in a similar way to the synthetic low dimensional images 2.

Figure 9:
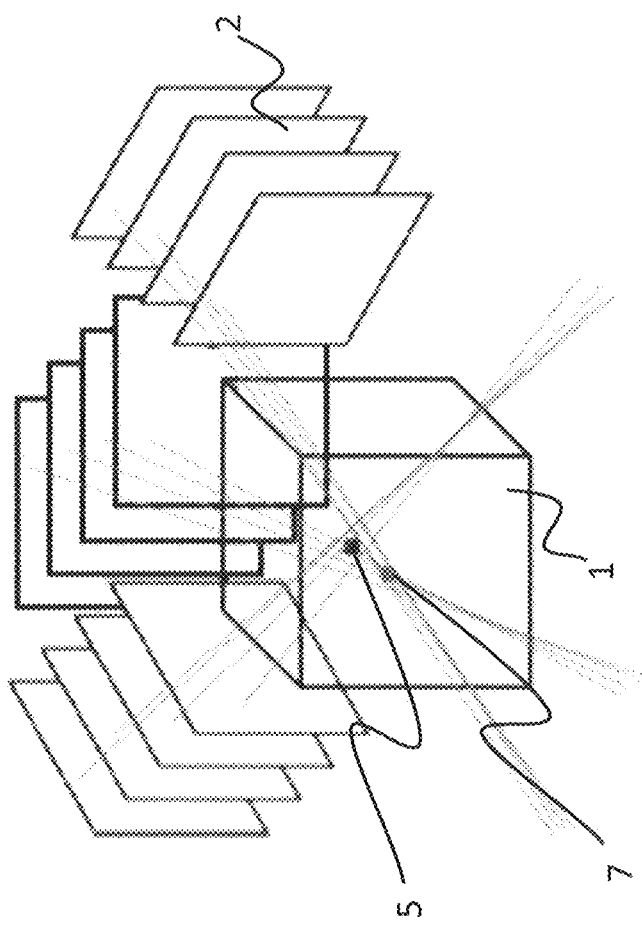
FIG. 9 is a schematic visualization of a part of the method according to another embodiment of the present invention.

FIG. 9 is a schematic visualization of a part of a method according to an embodiment of the present invention. Specifically, in FIG. 9 the method of determining the new landmarks 7 in the high dimensional image 1 is depicted. As already explained above, the position of the landmarks 5 in the CT 1 are refined. For this purpose, the point with the smallest Euclidean distance to both lines is calculated for each landmark 5 for each possible pair of lines. Then the barycenter of all these points is calculated. The newly obtained points are the new landmarks 7 for the CT 1 of the patient.

Figure 10:
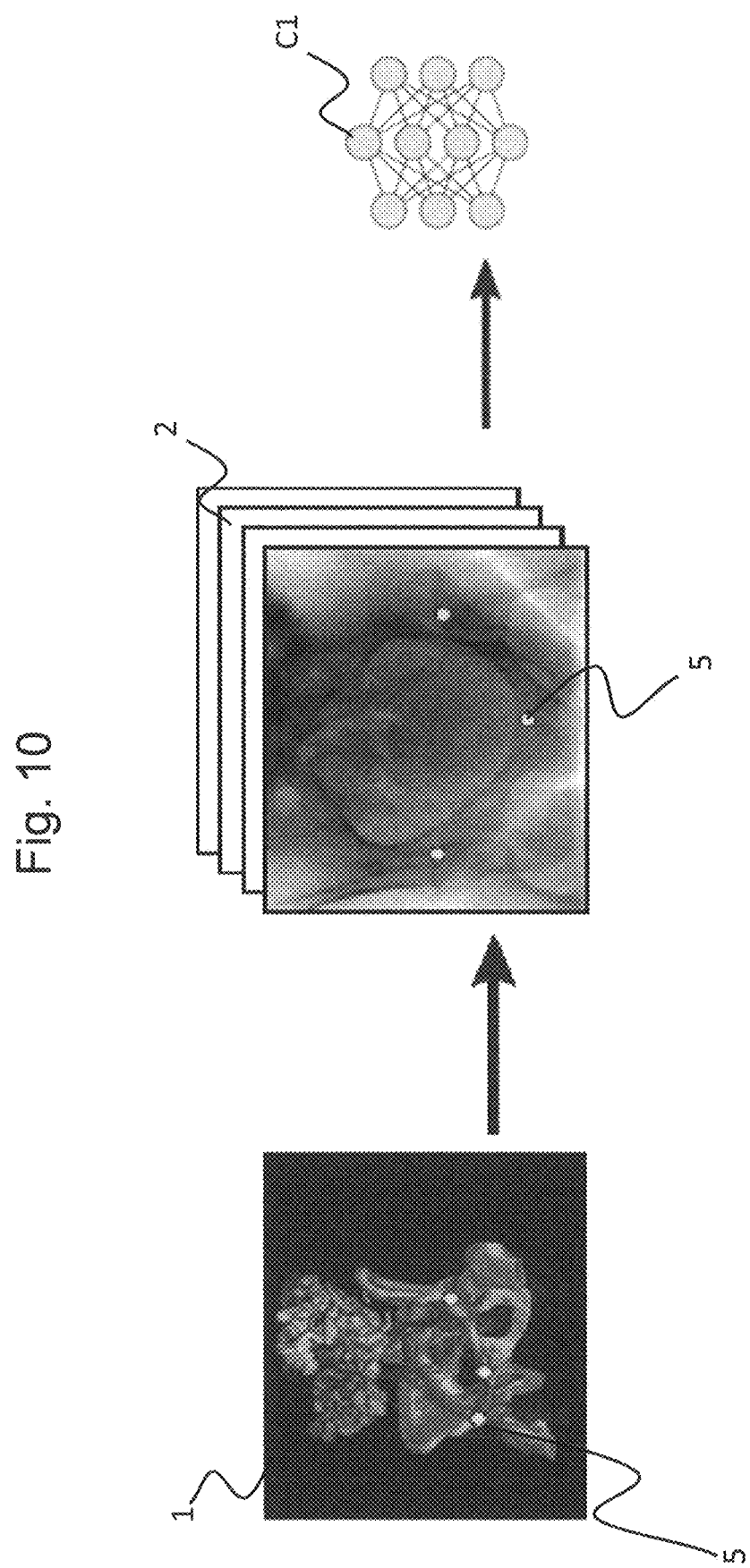
FIG. 10 is a schematic visualization of a part of the method according to another embodiment of the present invention.

FIG. 10 is a schematic visualization of a part of the method according to another embodiment of the present invention. Specifically, in FIG. 10 an example of an application of the present invention is schematically depicted. First, a neural network (which is an example of the learning algorithm) is pre-trained. This phase is run only once and for all.

Here, a convolutional the neural network C1 is trained to detect a set of anatomical landmarks on X-ray images. The training data for the neural network C1 consists of synthetically generated X-ray images from a collection of manually annotated CT volumes from 13 patients from an archive (referred to as the "pre-training set"). Twelve patients were used for training and one for validation. Landmark locations are chosen such that they correspond to clinically meaningful and clearly identifiable points. X-rays were generated with a Digitally Reconstructed Radiograph (DRR) generator.

For each CT 1, a total of 3,456 X-rays 2 were generated, covering a wide range of poses (Translation: ±15 mm along (x; y; z) (where x is medial/lateral, y is anterior/posterior, z is cranial/caudal); Rotation: ±35 around x, ±15 around y, and ±45 around z). Values are sampled evenly along those dimensions, with 6 rotation samples around z, 3 rotation samples around x and y, and 4 translation samples along x, y, and z. Ground truth landmarks for the training were obtained by projecting the points from the CT 1 to X-ray 2, knowing the DRR pose.

Training of the neural network C1 is carried out with the Adam optimizer for 4 epochs until convergence was reached, with a learning rate of 0:00001 and a batch size of 1.

These steps are visualized in FIG. 10. In particular, on the left side in FIG. 10 a CT 1 of a patient is depicted in which experts have manually annotated meaningful landmarks. Based on the CT 1 synthetic low dimensional images 2 are generated and the landmarks 5 are projected in the low dimensional images 2 (see in the middle of FIG. 10). The thus generated training set is used to train the neural network C1 depicted on the right side in FIG. 10. This phase may be referred to as a first phase.

FIG. 11 is a schematic visualization of a further part of the method according to the embodiment of the present invention. After the finishing the first phase depicted in FIG. 10, landmarks are automatically extracted in a second phase. A patient-specific CT 1, referred to as CTpat, is processed in three steps, as described in the following.

Phase 2.a—Ray back-projection:

X-ray images 2 are synthetically generated from CTpat 1 using the DRR generator, covering K=90 poses (Translation: ±15 mm along z; Rotation: ±15 around x, ±40 around z). Equidistantly spaced samples are chosen: 10 rotation samples around z, 3 rotation samples around x, and 3 translation samples along z. The neural network C1 is then applied to detect the rough locations of the landmarks 5. The known geometry of all the generated X-ray images 2 is exploited to back-project each point 5 onto a series of rays. Each ray passes through the detected location of the landmark 5 in the image and the camera center of the projection.

Phase 2.b—Landmark refinement:

Due to the prediction inaccuracy inherent to the first neural network C1, the set of 3D rays resulting from a given landmark 5 do not perfectly intersect on the same point in the CTpat. To cope with this lack of precision, a set of refined landmarks 7 is generated, respecting the two following criteria: each new landmark 7 shall 1) stay as close as possible to the barycenter of the intersection of all the rays, and 2) be located on the bone surface. The rationale of this refinement operation is to ensure that the new landmarks 7 describe meaningful local anatomical regions, thus facilitating learning and registration. This approach is independently conducted for all landmarks 5, and is described hereafter for a single landmark.

First, the point corresponding to the rough barycenter of the intersection of all rays is determined. For two given rays the closest equidistant point is calculated. A constant threshold (e.g. 6 mm) is used to discard candidate points when two rays are too far apart. The coordinates of the point are defined as the median x, y, and z coordinates of all valid points.

Then, the point corresponding to the projection of points onto the bone surface is determined. The volume CTpat 1 is first thresholded (Hounsfield units in [200; 500] are mapped to one bone, all other values are mapped to zero background). A contour detection scheme is then applied to the thresholded image (CT). The point is finally determined via a sphere-growing scheme centered on the point to find the closest point on the bone surface.

Phase 2.c—Patient-specific re-training:

Since the new landmarks 7 and do not necessarily describe the same real-world points, network re-training is necessary. The second neural network C2 is therefore generated to detect the refined landmarks 7 (i.e. the new landmarks 7). The weights of second neural network C2 are initialized with the weights of the first neural network C1. To enable patient-specific re-training, the synthetic DRR X-rays 2 are only generated from CTpat 1 (as opposed to from the collection of 13 patients used during phase 1).

Thus, generated X-ray poses are similar to those used during the training of the first neural network C1. Validation is carried out with 10% of randomly selected poses.

Lastly, the registration can be carried out in the third phase.

Phase 3—Intraoperative registration:

Here, the transformation matrix T is computed, to define the rough initial 6 DoF alignment of any new X-ray image2, as an input for a given registration method R. An unknown X-ray pose (i.e. previously unseen during phases 1-2) is generated from CTpat 1. First, the second neural network C2 is applied to fully-automatically infer the landmarks 7 on the Xray image 2. Then, T is computed via a Perspective-n-Point scheme, using the detected X-ray landmarks 7 together with the corresponding CTpat 1 landmarks 7 determined in phase 2. Finally, this rough initialization T is exploited by a fine registration R to accurately match the X-ray 2 to CTpat 1.

In the present embodiment the following imaging parameters are used for the X-ray C-Arm geometry: 1200 mm source-to-detector distance; 700 mm source iso-center; 384× 300 mm2 detector size; and 1:6 mm$^2$ isotropic pixel size and for the CT: 0:82 mm$^3$ isotropic voxel size.

FIG. 12 is a schematic visualization of a system according to an embodiment of the present invention. In FIG. 12 a system 10 includes a first interface 11, configured for receiving a high dimensional image 1, a second interface 12, configured for receiving low dimensional images 3 from an imaging device during a surgery, a computational unit 14, configured for executing the inventive method, and a third interface 13, configured for outputting a registered image. The interfaces 11, 12, 13 may communicate with other devices or elements not part of the System 10. Further the interfaces 11, 12, 13 are connected to each other via the computational unit 14.

The above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

1 high dimensional image
2 synthetic low dimensional image
3 low dimensional image
5 landmark
6 virtual low dimensional imaging device
7 new landmark
10 system
11 first interface
12 second interface
13 third interface
14 computational unit
C1 first learning algorithm
C2 second learning algorithm

The invention claimed is:

1. A computer-implemented method for registering low dimensional images with a high dimensional image, the method comprising the steps of:
 a) receiving a high dimensional image of a region of interest,
 b) simulating synthetic low dimensional images of the region of interest from a number of poses of a virtual low dimensional imaging device, from the high dimensional image,
 c) determining positions of landmarks within the synthetic low dimensional images by applying a first learning algorithm to the low dimensional images,
 d) back projection of the positions of the determined landmarks into the high dimensional image space, to thereby obtain the positions of the landmarks determined in step c) in the high dimensional image,
 e) receiving low dimensional images acquired with a low dimensional imaging device of the region of interest,
 f) determining positions of landmarks within the low dimensional images by applying the first or second learning algorithm to the low dimensional images, and
 g) registering the low dimensional images with the high dimensional image based on the positions of the landmarks.

2. The method of claim 1,
wherein the step of registering includes a step of determining the pose of the low dimensional imaging device used to acquire the low dimensional images, and
wherein in the step on determining the pose, a perspective-n-point problem is solved, which has the positions of the landmarks within the low dimensional images and the positions of the landmarks within the high dimensional image as an input and the pose of the low dimensional imaging device as an output.

3. The method of claim 1,
wherein the first learning algorithm is trained by the input training date and by output training data,
wherein the input training data comprises synthetic low dimensional images determined by simulating synthetic low dimensional images of the region of interest from a number of poses of a virtual low dimensional imaging device, from an arbitrary high dimensional image including the region of interest, and
wherein the output training date comprises positions of landmarks in the low dimensional images and is generating by manual landmark definition in the high dimensional image and projecting the landmarks from the high dimensional image to the low dimensional images.

4. The method of claim 1,
wherein the second learning algorithm is trained by input training data and by output training data,
wherein the input training data comprises synthetic low dimensional images determined in step b), and
wherein the output data comprises positions of the landmarks in the low dimensional images, generated by
 determining landmarks within the synthetic low dimensional images by applying the first learning algorithm to the synthetic low dimensional images,
 back projecting each of the determined landmarks of the synthetic low dimensional images in a hyperplane on the high dimensional space, wherein each hyperplane extends from each of the determined landmarks to the origin of the synthetic low dimensional image,
 generating new landmarks within the high dimensional image based on the hyperplanes, and
 projecting the new landmarks of the high dimensional image to the synthetic low dimensional images.

5. The method of claim 4, wherein each new landmark is generated at the intersection of the hyperplanes relating to the same landmark, within the high dimensional image.

6. The method of claim 4,
wherein the hyperplanes include projection lines extending through one landmark and the origin of the synthetic low dimensional image respectively, and
wherein each new landmark is generated by determining for each possible pair of projecting lines the point which has the smallest Euclidean distance to both lines, and by determining the barycenter of all points determined from all pairs of projection lines.

7. The method of claim 1, wherein the second learning algorithm is generated by retraining the first learning algorithm.

8. The method of claim 1, wherein the first learning algorithm and the second learning algorithm are a first trained artificial neural network and a second trained artificial neural network.

9. The method of claim 1, wherein the landmarks are anatomical features.

10. The method of claim 1, wherein the low dimensional image is one of the following: a 2 Dimensional (2D) X-ray image, a 2 Dimensional (2D) ultrasound image, a 2 Dimensional (2D) optical image, a 2 Dimensional (2D) scintigraphy or 2 Dimensional (2D) optoacoustic image.

11. The method of claim 1, wherein the high dimensional image is one of the following: a 3 Dimensional (3D) Computed Tomography image, 3 Dimensional (3D) Magnetic Resonance image, a 3 Dimensional (3D) ultrasound image, a 3 Dimensional (3D) Nuclear medicine image, a 3 Dimensional (3D) depth camera image, or a 3 Dimensional (3D) optoacoustic image.

12. A method for training or retraining an artificial neural network useful in finding landmarks in low dimensional images, the method comprising:
receiving input training date, namely synthetic low dimensional images of a region of interest simulated from a number of poses of a virtual low dimensional imaging device, from a high dimensional image of the region of interest,
receiving output training data, namely synthetic low dimensional images of the region of interest and position of landmarks within the low dimensional images,
wherein the output training data comprises positions of the landmarks in the low dimensional images, generated by
determining landmarks within the synthetic low dimensional images by applying a first artificial neural network to the synthetic low dimensional image,
back projecting each of the determined landmarks of the synthetic low dimensional images in a hyperplane on the high dimensional space, wherein each hyperplane extends from each of the determined landmarks to the origin of the synthetic low dimensional image,
generating new landmarks within the high dimensional image bases on the hyperplanes, and
projecting the new landmarks of the high dimensional image to the synthetic low dimensional images.

13. A system for registering low dimensional images with a high dimensional image, the system comprising:
a first interface, configured for receiving a high dimensional image,
a second interface, configured for receiving low dimensional images from an imaging device during a surgery,
a computational unit, configured for executing the method according to claim 1, and
a third interface, configured for outputting a registered image.

* * * * *